March 2, 1954
R. P. DUNMIRE
2,670,849
APPARATUS FOR FILTERING MATERIALS
Filed May 1, 1952
3 Sheets-Sheet 1
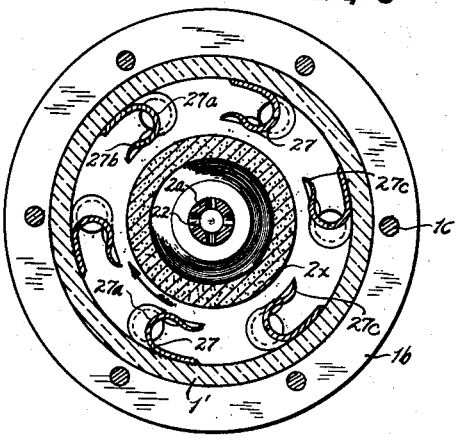
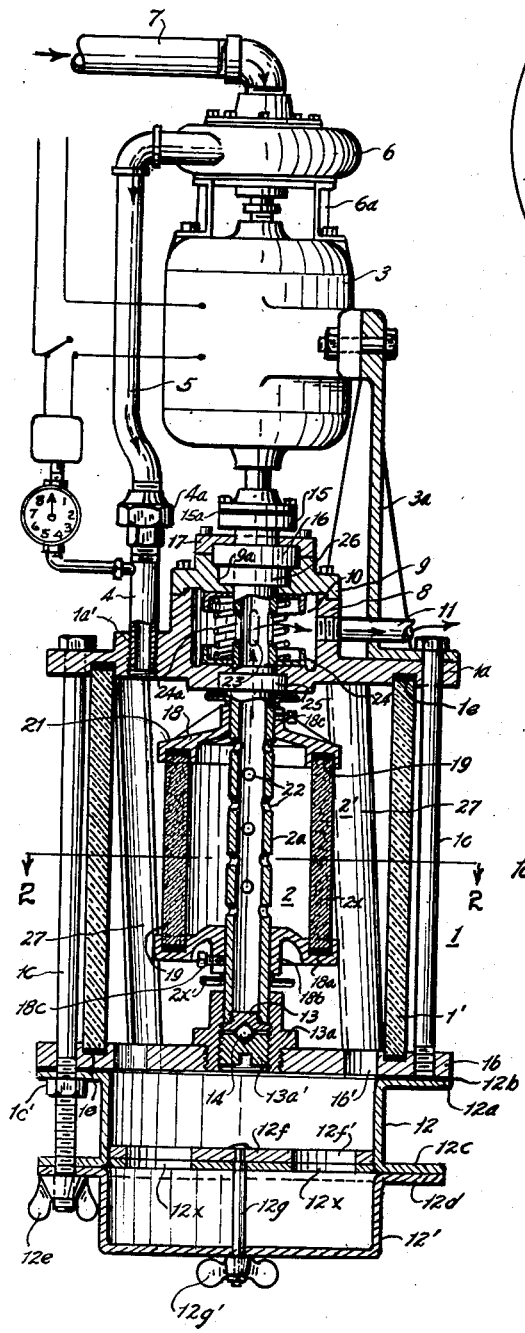
INVENTOR.
RUSSELL P. DUNMIRE.
BY
Geo. B. Pitts
ATTORNEY March 2, 1954 R. P. DUNMIRE 2,670,849
APPARATUS FOR FILTERING MATERIALS
Filed May 1, 1952 3 Sheets-Sheet 2

INVENTOR.
RUSSELL P. DUNMIRE.
BY
*Geo. B. Pitts*
ATTORNEY

INVENTOR.
RUSSELL P. DUNMIRE.
BY
*Geo. B. Pitts*
ATTORNEY

Patented Mar. 2, 1954

2,670,849

UNITED STATES PATENT OFFICE 2,670,849

APPARATUS FOR FILTERING MATERIALS

Russell P. Dunmire, Orange, Ohio

Application May 1, 1952, Serial No. 285,429

4 Claims. (Cl. 210—64)

This invention relates to a filtering apparatus wherein the material to be filtered is supplied under pressure to the outer surface of a hollow porous filtering wall, the porous filtering wall being rotated to establish outwardly thereof a centrifugal force which is utilized to insure efficient filtration or separation of a fluid content of the supplied material from solids, particles and suspensoids therein. Accordingly, the apparatus is advantageously adapted to filter various kinds of substances in gaseous or liquid phases and semi-solids, as well as fluids containing macro and micro solids in a new and efficient manner.

One object of the invention is to provide certain improvements in the form of construction disclosed in my co-pending application Ser. No. 535,026, filed May 11, 1944, now Letters Patent No. 2,442,234, dated May 25, 1948, wherein the agglomerated solids and masses are forced outwardly into contact with inclined deflectors or vanes which tend to force the agglomerated solids and masses downwardly for discharge, whereas in the present improvements the outwardly forced agglomerated solids and masses are collected in channels the walls of which co-act with the moving solids and masses to establish therein a field of centrifugal force effective to cause a further agglomeration of the solids and masses into larger bodies capable of gravitation.

Another object of the invention is to provide an improved filtering apparatus for separating micro particles and suspensoids from a fluid wherein the particles and suspensoids are subjected to a field of centrifugal force, due to the rotation of a filtering medium, to effect progressive agglomeration or coagulation thereof into masses and the masses are then subjected to a second field of centrifugal force counter in direction to that of the rotating medium to effect agglomeration of the agglomerated masses, whereby the latter are capable of gravitating to a receiver.

Another object of the invention is to provide an improved filtering apparatus having a rotating filtering wall through which the fluid to be filtered passes and an outer wall forming with the filtering wall a chamber into which material is supplied, the rotation of the filtering wall serving to effect a centrifugal influence in the chamber to force the solid portions of the material outwardly, and spacedly disposed means on the outer wall arranged to collect the outwardly forced material and impart spiral movement thereto to establish a centrifugal influence therein in a direction counter to that of the rotation of the filtering wall, the effect of which is to cause agglomeration of the separated out solid portions into masses capable of gravitating to a receiver.

Another object of the invention is to provide an improved filtering apparatus having an inner rotatable filtering wall through which the fluid passes and an outer wall forming with the inner wall a chamber, an inlet opening for material and a discharge opening at the lower end of the chamber, the rotation of the inner wall serving to establish outwardly thereof a primary field of centrifugal force, which is effective to separate the solids and/or particles from the supplied material, restrain them from lodgement on the filtering wall and cause agglomeration of the solids and/or particles into masses, and means on the outer wall for collecting the solids and masses and effective to provide therein a secondary field of centrifugal force to cause a further agglomeration of the solids and masses into larger bodies capable of gravitating to and discharge through the discharge opening.

Other objects of the invention will be apparent to those skilled in the art to which my invention relates from the following description taken in connection with the accompanying drawings wherein Fig. 1 is a view partly in elevation and partly in section of a filtering apparatus embodying my invention.

Fig. 2 is a section on the line 2—2 of Fig. 1.

Fig. 3 is a section similar to Fig. 2, but showing a modified form of construction.

Figure 4:
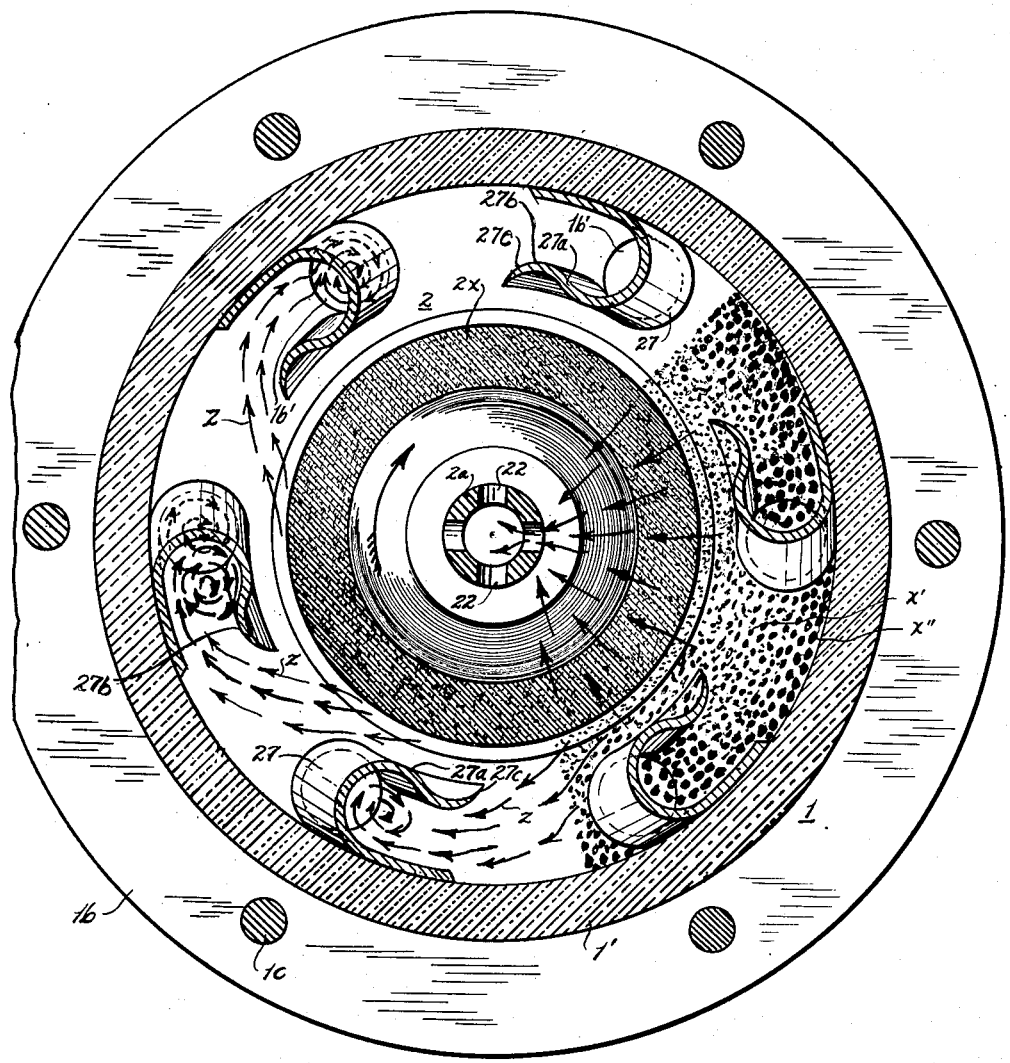
Fig. 4 is a section similar to Fig. 3, but enlarged to show the direction of flow of the filtrate and agglomeration of the particles and suspensoids into masses and bodies of solid materials.

In the drawings, 1 indicates as an entirety an outer casing to which the material to be filtered is delivered. 2 indicates as an entirety filtering or separating means within the casing 1 and driven by a suitable motor 3, preferably mounted on the casing 1 by means of a bracket 3a, in connected relation to the filtering or separating means to illustrate one form of driving means for the latter.

In the form of construction shown in Figs. 1 to 4, inclusive, the filtering or separating means consist of a casing 2' having an annular wall 2x which is formed of porous or foraminous material and through which the filtrate flows to effect filtration or separation of the supplied material, this wall being rotated about its axis by the motor 3 (as hereinafter set forth) to establish outwardly thereof a centrifugal force effective to act on those portions of the material that are to be separated therefrom.

By preference, the filtering wall forms the side wall of the casing 2', which is bodily rotated by the motor 3.

As set forth in my aforesaid co-pending application (now Letters Patent No. 2,442,234, dated May 25, 1948), the apparatus is adapted to operate on a wide range of materials. Accordingly, the size of the openings in the filtering wall will depend upon the kind or character of material to be filtered, its pressure and the speed of rotation of this wall; also, where the material to be filtered consists of a liquid, the speed of rotation of the filtering wall and the size of the openings therein will depend upon both the viscosity and pressure of the liquid.

The outer casing 1 consists of upper and lower heads 1a, 1b, formed with annular seats for an annular wall 1' and secured together and to the wall 1' by bolts 1c. The opposite ends of the wall 1' engage suitable gaskets 1e provided in the seats, whereby the casing 1 is made liquid tight. Either head or both heads 1a, 1b, may be provided with suitable instrumentalities (not shown), whereby the apparatus may be mounted on a suitable support or frame of a machine depending on the specific application of the apparatus. In the form of construction disclosed the wall 1' is formed of transparent material, such as glass. The head 1a is formed with an inlet 1a', the walls of which are preferably provided with screw threads to receive and mount a nipple 4, removably connected by a coupling 4a to a supply pipe 5, through which the material to be filtered or operated upon is supplied under pressure. In the preferred form of construction, the pipe 5 is connected to the outlet end of a suitable rotary pump 6 supported on brackets 6a which are secured to the casing of the motor 3, the rotor of the pump 6 being drivingly connected to the shaft of the motor 3, whereby one motor is utilized to drive both the inner casing 2' and pump 6. The material to be operated upon is supplied under pressure by gravity or otherwise by a pipe 7 suitably connected to the inlet end or side of the pump 6. The pump 6 being disposed in close relation to the outer casing 1, it insures delivery of the material through the inlet 1a' into the casing 1 at adequate pressure to insure flow of the filtered material into the casing 2', whereas the casing 2' is rotated, the effect of which is to establish outwardly thereof a centrifugal force which acts on the heavy and/or solid portions of the supplied material in opposition to the pressure thereof to prevent accumulation of such portions on the filtering wall of the casing 2' and outward movement thereof as later set forth. Accordingly, it is advantageous to provide a pump in close relation to the inlet for the casing 1 to insure a uniform supply of the material at the proper pressure thereto. The head 1a is provided with an annular upwardly extending collar 8 on which is removably mounted a cap 9 to form a chamber 10, the side wall of the collar being formed with a screw threaded outlet opening to which a discharge pipe 11 (later referred to) is connected. The lower head 1b is formed with one or more openings 1b' (six openings 1b' in annular arrangement being shown) through which that portion of the material, which is prevented from filtering through and into the inner casing 2', gravitates or is directed, as later set forth, into a receptacle 12, removably related to the head 1b. By preference, the receptacle 12 is provided with a flange 12a formed with openings, so that certain of the bolts 1c may be extended through the head 1b and flange 12a and engaged by nuts 1c' for removably supporting the receptacle on the head 1b. As shown, a gasket 12b is provided between the flange 12a and head 1b to prevent leakage from the casing 1. The bottom wall of the receptacle 12 is provided with one or more valved drain openings 12x leading to a receiver 12' removably supported on the bottom wall of the receptacle 12. For this purpose the side wall of the receptacle 12 is provided with a flange 12c which is engaged by a flange 12d on the open end of the receiver 12'. The flanges 12c, 12d, are formed with alined openings, so that the extended ends of those bolts 1c which support the receptacle 12 on the end wall 1b, may extend through the openings and by means of wing nuts 12e removably secure the receiver 12' in position. The valve for the drain openings 12x consists of a disk 12f, which is fixed to the upper end of a shaft 12g extending through and rotatably mounted in the bottom walls of the receptacle 12 and receiver 12'. The lower end of the shaft 12g is provided with a removable handle 12g' (preferably consisting of a wing nut), whereby the disk 12f may be rotated. The bottom wall of the receptacle 12 is preferably formed with two diametrically related openings 12x and the disk 12f is formed with similarly related openings 12f' so that in one position of the disk 12f the openings 12x are closed and in another position thereof the openings 12f', 12x, are in registered relation, whereby the collected solids in the receptacle 12 may be discharged into the receiver 12', following which the disk 12f is rotated to close the openings 12x. By removing the nut 12g', the receiver 12' may be removed and emptied of the solids therein and replaced. By this arrangement, the solids may be removed without stopping the filtering operation.

The casing 2' comprises the following: 2a indicates a hollow shaft mounted axially of the casing 1 and preferably closed at its lower end by a threaded plug 13. As the shaft 2a is hollow, it may be utilized as the conduit for the filtrate from the inner side of the wall 2x to the discharge pipe. The lower end of the shaft 2a loosely fits an upstanding collar or boss 13a provided on the inner face of the head 1b. The lower end of the collar 13a is closed by a screw plug 13a'. The opposed faces of the plugs 13, 13a', are formed with related recesses in which is mounted a ball 14 to provide an anti-friction and thrust bearing for the shaft 2a. The upper end of the shaft 2a extends through alined openings formed in the head 1a and cap 9 for connection by means of a suitable coupling 15 with the shaft of the motor 3. A gasket 15a is interposed between the parts of the coupling 15 to prevent the escape of the filtrate from the shaft 2a. The casing 1 is provided with anti-friction bearings 16 for the upper end of the shaft 2a. In the arrangement illustrated the upper end of the cap 9 is recessed as shown at 9a to accommodate the anti-friction bearings 16 between it and the shaft 2a, the bearing 16 being secured in position by an annular ring 17, removably bolted to the cap 9. 18, 18a, indicate spaced upper and lower heads each having a hollow boss 18b, fitting the shaft 2a and removably secured thereto by a set screw 18c. The inner faces of the heads 18, 18a, adjacent their peripheries, are formed with alined recesses 19 which form seats for the opposite ends of the porous or foraminous wall 2x. It will be understood that the wall 2x may be of any desired thickness and the openings therethrough may be of varying sizes for reasons already set forth. Where a porous wall is employed, it may be formed of carborundum, carbon, compressed powdered metal or artificial stone. The seats 19 are preferably annular and the wall 2x is preferably formed of a single section of material shaped in cross section to removably fit the seats 19, whereby the casing 2' is of true cylindrical form, but the invention is not to be limited to a wall of this cross-sectional shape, since the centrifugal force set up due to the rotation of the casing 2' will be effective where this wall is sectional or of some other shape. Suitable gaskets 21 are interposed between the opposite ends of the wall 2x and the bottoms of the seats 19 to prevent leakage of the filtrate from the casing 2'. The side walls of the shaft 2a between the heads 18, 18a, are formed with a plurality of openings 22, to permit flow of the material filtered through the wall or zone 2x into the shaft 2a. That portion of the shaft 2a extending through the chamber 10 is formed with a plurality of openings 23 (preferably elongated longitudinally of the shaft) to discharge the filtrate into the chamber 10 for discharge through the pipe 11. The side walls of the openings 23 act centrifugally on the filtrate flowing up through the shaft to increase the flow thereof into and through the pipe 11. 24 indicates a pair of plates surrounding and closely fitting the shaft 2a within the chamber 10 and engaged by a coiled expansion spring 24a which normally holds the plates in engagement with the bottom wall of the chamber 10 and inner face of the cap 9. 25 indicates a suitable seal mounted in an annular recess formed in the lower side or face of the head 1a and having a spring operated sealing element engaging the shaft 2a to prevent the escape of material in the casing 1, due to pressure or capillary attraction, into the chamber 10. 26 indicates a suitable seal mounted in an annular recess formed in the cap 9 below the bearing 16 and having a spring operated sealing element engaging the shaft 2a to prevent the escape of material in the chamber 10 into the bearing and outwardly therethrough.

To divert the material in the casing 1 away from the bearing 14 and seal 25, I provide on the shaft 2a adjacent each of these parts a plurality or set of outwardly extending arms or wings 2x', the revolution of which by the shaft imparts movement to the material outwardly. In the form of construction shown the arms or wings 2x' of each set consist of ridges embossed on a metal disk which is provided with a collar secured to the shaft 2a in any desired manner.

27 indicates a plurality of collecting members spaced uniformly around the inner face of the wall 1', each member being of substantially U-shape in cross section, to provide a curvilinear bottom wall and side walls 27a for a purpose later set forth. The members 27 are disposed at an angle to the axis of the casing 1 and extend from the head 1a to the head 1b, with their lower ends in registry with the openings 1b', respectively. One side wall of each member is suitably fixed to the wall 1' and mounted with respect to the casing 2', so that the space between the side walls of the member opens in a direction counter to the direction of rotation of the wall 2x. The members 27 co-act with the rotating wall 2x and centrifugal force established thereby, as later set forth. The members 27 on the wall 1' serve as barriers (a) which prevent rotative movement of the material (or portions thereof) supplied to the casing 1 due to frictional contact of the casing 2' therewith and (b) set up a turbulence or agitation in the material, whereby the heavy or solid portions thereof may be more readily separated from the fluid portion. By preventing rotation of the material in the casing 1, the outer surface of the wall 2x of the casing 2' is continuously washed by portions of the material without unduly affecting the flow of the liquid material through the wall 2x due to the pressure of the material supplied to the casing 1.

In operation, the material is supplied into the casing 1 under pressure for contact with the filtering wall 2x, which being of a porous character, permits the liquid or fluid portion of the material to flow therethrough into the casing 2' from which it flows through the shaft 2a to the chamber 10 for discharge through the pipe 11. Due to the revolution of the wall 2x a centrifugal force or zone is established on its outer surface and in the liquid or fluid material adjacent thereto, which force acts on the heavy and/or solid portions of the supplied material to impart an outward movement thereof away from the wall 2x and hence prevents such portions from accumulating or being deposited on this wall. As there is a continuous supply of the material to the casing 1 and a continuous centrifugal force imparted to the heavy or solid portions thereof, the latter are forced outwardly and then downwardly into the receptacle 12 due to the angular arrangement of the deflectors 27. Accordingly, it will be observed that the filtering wall 2x is automatically maintained free of those portions of the material which would clog or tend to clog the pores thereof, so that the supplied material is rapidly and efficiently filtered. It will be observed that the rate of flow or pressure of the supplied material must be regulated or the speed of the casing 2' be regulated so that the centrifugal force established will not prevent the inflow of material into the casing 2', but will operate effectively upon the heavier and/or solid portions of the material without unduly affecting the flow of the filtrate into casing 2'. In other words, the speed of the casing 2' must be related to or balanced against the pressure of the supplied material. Where the material to be filtered is a liquid, this speed and pressure must be regulated with respect to the viscosity of the material, to insure flow of the liquid or fluid at a predetermined rate and rapid and efficient operation. As shown, the motor 3 is directly coupled to the shaft 2a and pump 6, so that the latter is designed for a predetermined capacity in relation to the speed of the casing 2' and viscosity of the material to be supplied to the casing 1. It will be obvious that a suitable speed change mechanism may be interposed between the motor 3 and shaft 2a or between the motor 3 and pump 6 to meet varying conditions, dependent upon the kind and/or viscosity of the material to be operated upon; or a variable speed motor may be employed and the pump 6 driven by a separate motor.

It will be observed that the type, character or construction of the wall 2x will depend upon the kind of material to be filtered and/or the character or size of the heavy particles or bodies therein. For example, this wall may consist of sheet metal formed with openings of any desired size, or wire mesh of any desired screen capacity per square inch.

On the other hand, this wall 2x may be adapted to separate out the heavier portions of immiscible liquids. In employing a liquid of this character the macro solids or particles are progressively forced outwardly and caused to unite or agglomerate with other particles into larger sizes or masses, as shown at x' (see Fig. 4) and these masses may in turn unite or agglomerate into still larger masses, as shown at x''. As these masses x' and x'' are under the influence of the centrifugal force, and the rotation of the wall 2x tends to move them in a general circular direction (see arrows z in Fig. 4), the masses are forced into the collecting members 27, the curvilinear bottom and side walls of which guide the larger masses into a spiral rotating body to establish therein a secondary field of centrifugal force counter to that established by the rotating wall 2x, thereby causing a further or supplemental agglomeration of the masses to form larger bodies of solid materials capable of freely gravitating downwardly into the receiver 12; as the agglomerating operation is progressively effected to form and accumulate these bodies in the members 27 and the walls of the latter are disposed at an inclined angle, the centrifugal force on the previously agglomerated masses tends to supplement the gravitational influence to impart a rapid downward flow of these bodies. It will be observed that the members 27 operate as collectors for the masses as well as guide means for directing them downwardly. Where the fluid to be filtered contains microorganisms or particles in the solid and/or liquid phase, they are caused to agglomerate progressively by action of the primary centrifugal force until the combined agglomerated organisms or particles build up into masses having a size capable of being further acted upon by the secondary centrifugal force in the manner already set forth, whereby bodies of solid materials are formed and directed downwardly through the members 27.

The outer side wall of each member 27 may be substantially parallel to its inner side wall, as shown in Figs. 1 and 2, but by preference, the outer side wall of each member 27 is curved inwardly, as shown at 27b (see Figs. 3 and 4) to direct the moving masses in a spiral direction, whereas its outer edge portion is curved outwardly as shown at 27c to allow a maximum intake of the masses into the member 27.

Figure 5:
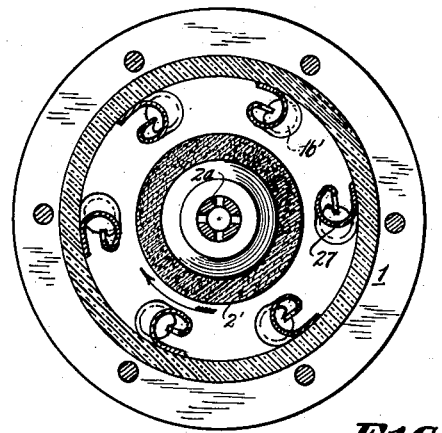
Fig. 5 is a section similar to Fig. 2, but showing another modified form of construction.
Figure 6:
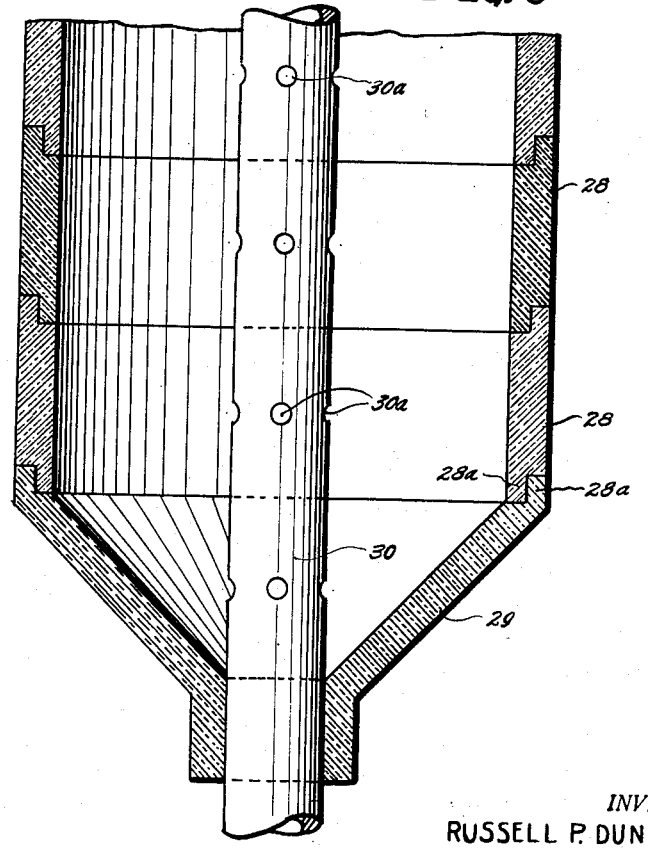
Fig. 6 is a fragmentary section of the filtering member of sectional form adapted for use where a large volume of material is supplied to the apparatus and filtered.

Fig. 5 illustrates a form of construction wherein the outer or terminating edge portion of the outer side wall of each member is curved inwardly from end to end thereof to prevent the escape of the solid bodies during their flow to the adjacent opening 1b'.

Where a continuously supplied relatively large volume of material is to be filtered, the inner or filtering casing of the apparatus is constructed as shown in Fig. 6 to simplify the manufacture and assembly thereof. In this form of construction, the casing consists of a plurality of annular sections 28, having on their circumferential upper and lower edges complementary seating elements 28a to support them in alined axial relation, the lowermost section being mounted on an adapter 29 the lower end of which is suitably fixed to a hollow shaft 30. The shaft 30 is formed with inlet openings 30a and mounted and driven in the manner already set forth with respect to the shaft 2a. The side wall of each section 28 is formed of suitable porous material. In this form of construction any number of sections 28 may be employed to provide a filtering wall of any desired area. The uppermost section is provided with an adapter (not shown) suitably connected to the shaft 30, these adapters serving to connect the shaft 30 to the sections 28, whereby the latter are rotated therewith to establish a centrifugal force outwardly thereof, while permitting the liquid to filter through the sections for discharge through the shaft 30.

No claim is made herein to the subject-matter of my aforesaid co-pending application, now Letters Patent No. 2,442,234.

To those skilled in the art to which my invention relates, many changes in construction and widely differing embodiments and applications thereof will suggest themselves without departing from the spirit and scope of the invention. My disclosures and the description herein are purely illustrative and are not intended to be in any sense limiting.

What I claim is:

1. In a filtering apparatus, the combination of a substantially liquid tight casing consisting of upper and lower end walls and a side wall, means for supplying material under pressure to said casing, a separate casing mounted within said first mentioned casing to rotate about a vertical axis and provided with a porous side wall through which the material is filtered, outlet connections for the filtrate leading from the interior of said separate casing through one of said end walls, means for rotating said separate casing to effect a centrifugal force on the heavy particles of the material, the lower end wall of said first mentioned casing being formed with openings through which the heavy particles are discharged, and collectors disposed in spaced relation adjacent to and around the inner surface of the side wall of said first mentioned casing and connected at their lower ends to said discharge openings, respectively, the walls of each said collector being curvilinear and of substantially U-shape in cross section, the opening between the sides of each collector being in opposed relation to the direction of rotation of said separate casing to receive the heavy particles of the material forced outwardly under the influence of the centrifugal force, and arranged to direct the heavy particles into spiral paths the effect of which is to cause agglomeration of the particles into masses for gravitating endwise of said collector to and through the adjacent discharge opening, said collectors being inclined to the axis of said first mentioned casing to supplement the gravitational effect on the masses.

2. An apparatus as claimed in claim 1 wherein a collecting receptacle is provided on the lower end of said first mentioned casing for the masses discharged through said discharge openings, a receiver removably secured to the walls of said receptacle, and valve means are provided between said receptacle and said receiver.

3. An apparatus as claimed in claim 1 wherein the outer side of each collector is provided from end to end thereof with an extension which is bent inwardly and extends parallel and in spaced relation to said side toward the bottom of the adjacent collector.

4. In apparatus of the class described, the combination of a casing consisting of upper and lower end walls and an annular side wall, said lower end wall being formed with a plurality of annularly arranged discharge openings, means for supplying into said casing fluid under pressure to be filtered, filtering means within said casing and connected to an outlet in the latter, said filtering means including a hollow member having a shaft rotatably mounted in said upper and lower end walls and providing a flow connection from the interior of said member to said outlet, the side wall of said member consisting of an annular porous side wall through which the filtrate flows from said casing into said member, means for rotating said member to establish outwardly of said porous side wall a centrifugal influence to force the heavy particles of the fluid away from said porous side wall, and spacedly related collecting members for the heavy particles spaced from said porous wall and associated with and extending longitudinally of the side wall of said casing and each connected at its lower end to one of said discharge openings, each of said collecting members consisting of curvilinear walls of substantially U-shape in cross section forming an opening opposed to the direction in which said filtering member rotates and arranged to guide the outwardly forced particles into a spiral in a direction counter to that of said rotatable member.

RUSSELL P. DUNMIRE.

References Cited in the file of this patent

UNITED STATES PATENTS

| Number | Name | Date |
| --- | --- | --- |
| 978,450 | Homans | Dec. 13, 1910 |
| 1,262,146 | Ward et al. | Apr. 9, 1918 |
| 2,144,418 | Schramm | Jan. 17, 1939 |
| 2,338,779 | Mutch | Jan. 11, 1944 |
| 2,442,234 | Dunmire | May 25, 1948 |
| 2,596,384 | Dunmire | May 13, 1952 |

FOREIGN PATENTS

| Number | Country | Date |
| --- | --- | --- |
| 2,420 | Great Britain | of 1912 |